United States Patent [19]
Ford et al.

[11] 4,093,100
[45] June 6, 1978

[54] PRESSURE VESSEL CONSTRUCTION AND METHOD

[75] Inventors: Hugh Ford, London, England; George J. Mraz, Warren, Pa.; Jean Noel Simier, Lillebonne, France

[73] Assignees: National Force Company, Irvine, Pa.; Societe Chimique des Charbonnages-CDF Chimie, Paris, France

[21] Appl. No.: 626,084

[22] Filed: Oct. 28, 1975

[51] Int. Cl.² ............................ B65D 7/22; B65D 7/44
[52] U.S. Cl. ............................................. 220/3; 52/224; 138/147; 138/148; 220/71
[58] Field of Search .............. 220/3, 71, 83, 15, 9 A, 220/10, 9 C; 52/245, 249, 224; 138/148, 147, 153; 29/447; 277/208, 207 R

[56] References Cited
U.S. PATENT DOCUMENTS

| 813,918 | 2/1906 | Schmitz | 138/143 |
|---|---|---|---|
| 1,930,285 | 10/1933 | Robinson | 138/148 |
| 1,940,277 | 12/1933 | Stresau | 220/15 |
| 2,253,093 | 8/1941 | Raichle et al. | 220/3 |
| 2,280,501 | 4/1942 | Stephenson | 220/71 |
| 2,312,420 | 3/1943 | Kopf et al. | 220/3 |
| 2,475,635 | 7/1949 | Parsons | 138/148 |
| 3,044,657 | 7/1962 | Horton | 220/80 |
| 3,167,204 | 1/1965 | Rouse, Jr. | 138/148 |
| 3,471,053 | 10/1969 | Endicott et al. | 220/71 |
| 3,503,171 | 3/1970 | Frohly | 220/3 |
| 3,557,839 | 1/1971 | Uto et al. | 138/143 |
| 3,874,544 | 4/1975 | Harmon | 220/3 |

FOREIGN PATENT DOCUMENTS 925,134  5/1963  United Kingdom ............... 220/9 A Primary Examiner—William Price
Assistant Examiner—Allan N. Shoap
Attorney, Agent, or Firm—Charles B. Smith

[57] ABSTRACT

A pressure vessel with an alloyed steel wall and having at least one ring of weldable steel secured thereon and wherein a temperature control jacket associated with said vessel is welded to said ring.

7 Claims, 5 Drawing Figures

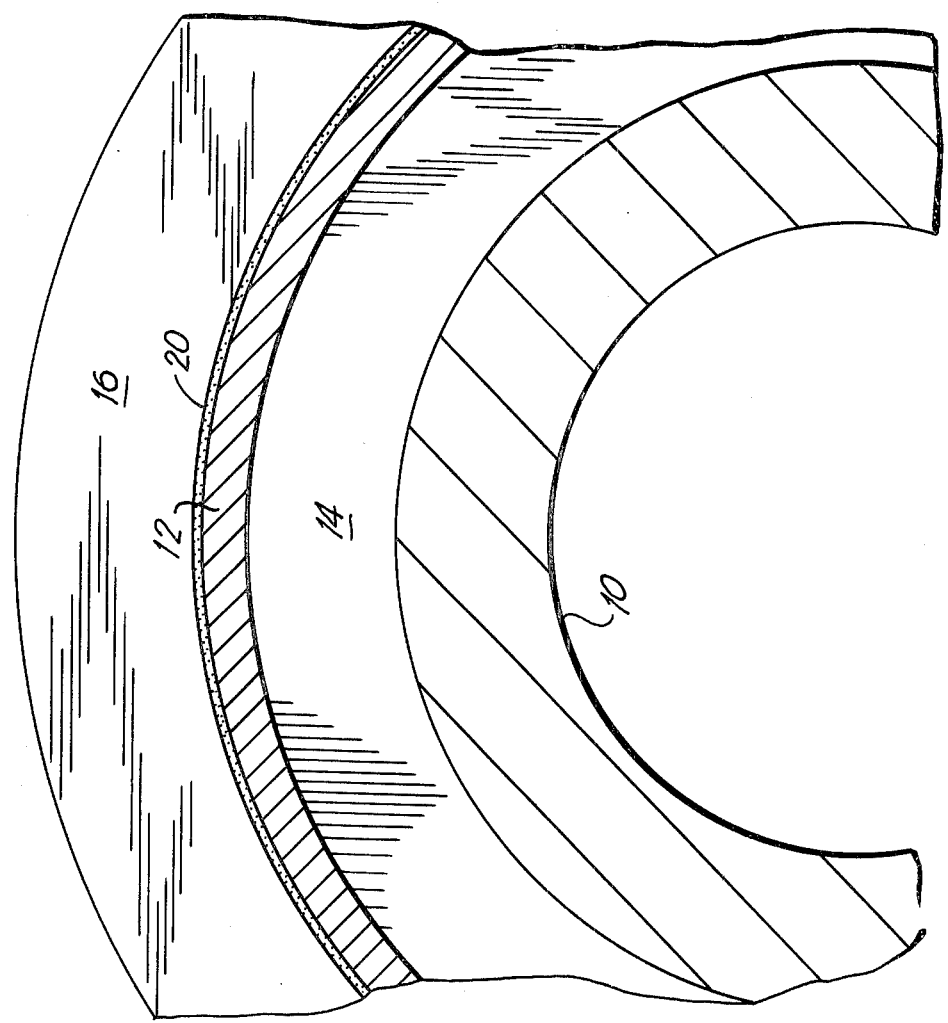
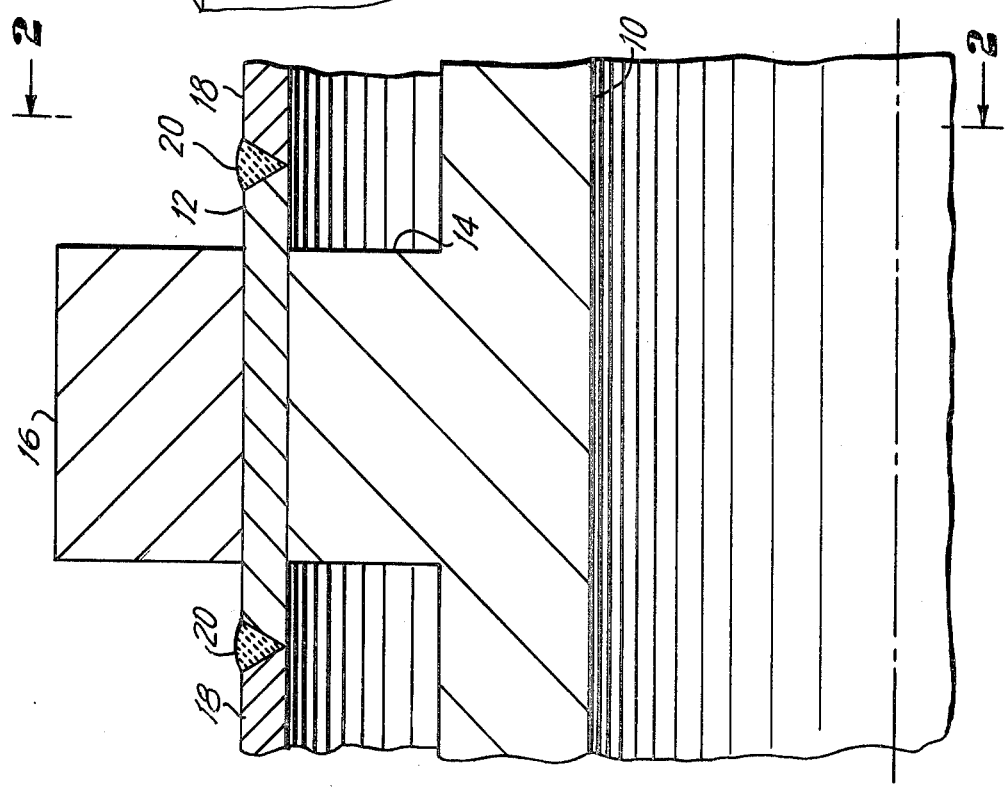

PRESSURE VESSEL CONSTRUCTION AND METHOD

BACKGROUND OF THE INVENTION

Many pressure vessels or pressurized reactors used in the chemical process industries require that means be provided to either heat or cool the vessel. To satisfy this requirement, it has been conventional practice to weld a temperature control jacket to the reactor vessel thereby defining an annular space around the vessel through which a heat transfer fluid can be circulated.

Pressure vessels which operate at a relatively low pressure are usually made from welded steel plates. Generally, the welding of a temperature control jacket to such a vessel presents no difficulties since the vessel is made of a grade of steel which is suitable for welding.

However, in the case of vessels and reactors which contain high pressures, different constructions are employed in order to withstand safely the associated high operating pressure levels. For example, pressure vessels which contain pressures greater than 5,000 psi generally include walls of a substantial thickness, e.g. greater than 3 inches, and the materials which comprise the vessel wall are usually high strength, alloyed steels rather than plain carbon steels. As a result, the material used for the construction of such pressure vessels is not well suited for welding.

Increasingly, vessels for operating at high pressures, e.g. pressures greater than 5,000 psi, are manufactured by forging the entire body from a single high strength alloyed steel ingot, thus eliminating the need for any welding of the vessel structure. However, the necessity of a temperature control jacket still exists and it has been the practice to machine suitable projections on the outside of the vessel body and then weld a temperature control jacket to such projections. However, there are a number of problems associated with such a manufacturing technique and the resulting product. For example, because the vessel material is not optimally suited for welding, extensive pre-welding preparation is required, such as buttering, as well as carefully controlled preheating, in order to insure that the weld is made at a specific elevated temperature. After the weld has been made, an equally extensive post weld heat treatment must be provided. Notwithstanding all these precautions, there is a significant tendency for weld cracks to form and such cracks, although seemingly local anomalies at the jacket welds, may grow and propagate into the main body of the vessel thereby causing a premature failure.

The invention disclosed herein provides an effective solution to the problem of welding a temperature control jacket to a high pressure reactor vessel wherein the vessel is constructed of a material which is not well suited for welding.

SUMMARY OF THE INVENTION

An improved construction for a pressure vessel which includes a temperature control jacket wherein the improvement resides in providing at least one ring disposed around the vessel and wherein the temperature control jacket is welded to the ring. Disposed around the ring are means for radially compressing the ring. The radial compressing means may be a second ring, shrink fitted about the first ring or a belt wrapped around the first ring or wire wrapped about the first ring.

The first ring may be slidably mounted around the pressure vessel or shrink fitted thereon. In either event, the material of which the ring is constructed is a weldable material.

The wall of the pressure vessel will generally be an integral, one piece construction and may be provided with at least one outwardly extending flange about which the first ring is mounted. Also, the wall of the pressure vessel will generally be constructed of a high strength, alloyed metal which is not optimally suited for welding. In the event that a second ring is used to radially compress the first ring, the second ring will generally be constructed of a high strength material, for example a high strength, alloy steel similar to the material used to construct the wall of the pressure vessel.

By the practice of this invention, a temperature control jacket may readily be welded to the first ring. Additionally, any cracks which form as a result of welding the jacket to the first ring will not propagate into the wall of the pressure vessel. Also, since the first ring is not initially tensilely stressed to any substantial degree, this construction will not fail even if the pressure within the vessel is increased substantially beyond the normal, maximum operating pressure. Thus, with the construction of this invention, the weldable rings and the temperature control jacket may be mounted on the vessel and the vessel then may be tested at pressures substantially greater than the normal, maximum operating pressure of the vessel.

DESCRIPTION OF THE DRAWINGS

FIG. 1 is a fragmentary view, in section, of one embodiment of the invention.

FIG. 2 is a sectional view taken along the section line 2—2 of FIG. 1.

DESCRIPTION OF PREFERRED EMBODIMENTS

Figure 3:
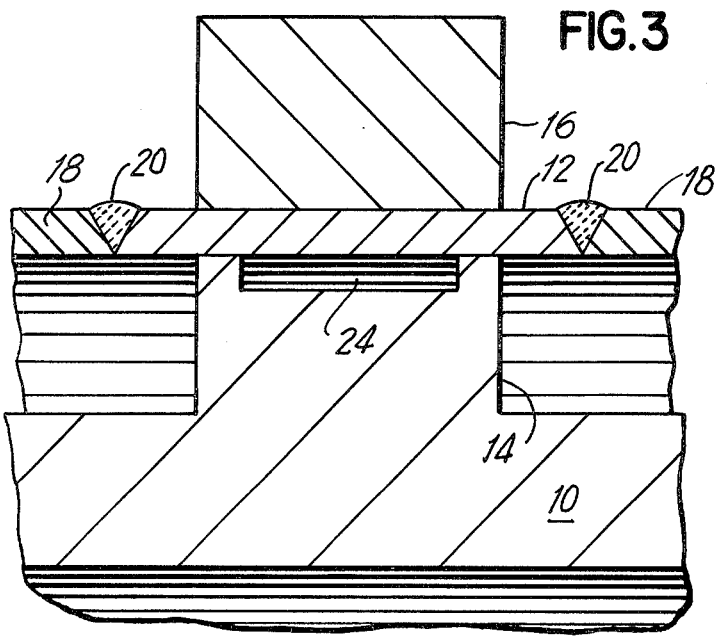
FIGS. 3–5 are fragmentary views, in section, showing alternate embodiments of the invention.

Referring to FIG. 1, there is shown a portion 10 of the wall of a high pressure reactor or vessel. Pressure vessels of the type with which this invention will be employed generally operate at pressures greater than 5000 psi and will have a wall thickness in the range of 3 inches or more. As previously indicated, in order to safely contain such high pressures the wall of such a vessel is often of a unitary, integral construction, i.e. the pressure vessel is often forged from a single ingot of high strength alloy steel. While such material provides adequate strength to resist high internal pressures within the vessel, as previously indicated it is generally difficult to weld any material directly thereto, for example a temperature control jacket. Although such welding can be effected, substantial pre-welding and post welding treatments are required. Additionally, as previously indicated, if a temperature control jacket is welded directly to the vessel body, any cracks developing as a result of the welding operation may propagate into the vessel wall and cause a premature failure.

As shown in FIG. 1, the instant invention substantially solves the problems noted above by providing a ring 12 of weldable steel disposed around the vessel wall 10 and preferably disposed around an outwardly directed flange 14. Those skilled in the art to which this invention pertains will be aware of the steels or other materials which may be characterized as weldable, i.e. materials which may be welded without any substantial pre-weld or post weld treatments. Generally, such materials are plain carbon steels having a carbon content not greater than approximately 0.35 percent.

As shown in FIG. 1 and 2, the weldable carbon steel ring 12 is disposed around the flange 14 and the temperature control jacket 18 is welded to the ring 12 as at 20.

Preferably, the ring 12 is initially slidably mounted around the flange 14. Thereafter, in the embodiment of FIGS. 1 and 2, a second ring 16 is shrink fitted around the first ring 12. The second ring 16 is constructed of a high strength material, for example a high strength alloy steel material of the type used in the construction of the wall 10 of the pressure vessel. Because the second ring 16 is shrink fitted around the first ring 12, the second ring 16 functions to radially compress the first ring 12. As a result, the ring 12 is compressed against the outer surface of the flange 14 and a liquid tight seal is thereby provided between the flange 14 and the ring 12. When this construction has been obtained, it will be noted that the flange 14 and the first ring 12 are compressively stressed whereas the second ring 16 is tensilely stressed. This factor is of significance with respect to stresses which are imposed upon the first ring 12 when the vessel is operated or tested. Thus, when the pressure within the vessel is high there will be a tendency for radial growth of the vessel. Such radial growth will be restrained, in the area of the flange 14, by the shrink fitted ring 16. Since the shrink fitted ring 16 is constructed of a high strength, alloy material, it is well suited for resisting the stresses caused by outward growth of the pressure vessel. More significantly, however, is the fact that the weldable carbon steel ring 12 is not subjected to substantial tensile stresses as a result of radial growth of the vessel because such growth is impeded by the shrink fitted outer ring 16. Thus, the first ring 12 is primarily subjected to bearing stresses. Such a distribution of stresses is significant when compared to the situation which would exist if the second ring 16 were absent and the first ring 12 was shrink fitted around the flange 14. With such a construction, radial growth of the vessel would impose substantial tensile stresses in the ring 12. While the ring 12 may be designed adequately to resist such stresses at normal operating pressures, a difficulty is presented when the vessel is to be tested at a pressure of, for example, 1.5 times the normal maximum operating pressure. Thus, if a pressure vessel were tested at a pressure far in excess of its normal maximal operating pressure and if the first ring 12 was not surrounded by a second ring, the stresses in the ring 12 may exceed the yield point of the material from which the ring 12 is constructed. This result is particularly likely in view of the fact that the ring 12 is constructed of a weldable material (generally a plain carbon steel) and therefore the ring 12 will not possess the same strength characteristic as the high strength alloyed steel used in the construction of the vessel body.

Thus, it will be seen that the combination of the instant invention, as exemplified by the embodiment of FIGS. 1 and 2, uniquely cooperates such that the ring 12 provides a weldable material to which the temperature control jacket may be secured while the ring 16 retains the ring 12 in place and provides the desired sealing betwen the ring 12 and the flange 14. Additionally, the second ring 16 absorbs stresses resulting from radial growth of the vessel and thereby insures that the ring 12 is subjected mainly to bearing stresses.

Although the stress distribution characteristics described above are significant, one of the most important aspects of this and other embodiments of the invention is the fact that weld cracks cannot propagate into the vessel wall. Thus, if any weld cracks should be formed when the temperature control jacket is welded to the ring 12, a growth of such cracks will not impair the integrity of the vessel wall. At worst, a leak of the low pressure temperature control fluid might occur. As such it will be seen that this invention provides both an improved method for fabricating a jacketed high pressure reactor and the result of practicing this method is a jacketed, high pressure reactor having superior resistance to premature failure.

Referring to FIG. 3, there is shown another embodiment of the instant invention. Specifically, in the embodiment of FIG. 3 the center, pherpherial portion of the flange 14 has been undercut to provide the annular space 24. As a result, the bearing surface area between the flange 14 and the ring 12 is reduced with the consequent effect of increasing the bearing pressure between the ring 12 and the remaining portions of the flange 14. By the use of this construction, higher sealing pressures may readily be obtained between the ring 12 and the flange 14. In this connection, it should be noted that it is generally desirable that a high pressure seal of some type exist between the flange 14, the ring 12 and the ring 16 since it may be necessary to provide an aperture through these components. Such an aperture may be required to provide means for transporting a process fluid into or out of the reactor. Since the pressure of the process fluid will be high, e.g. greater than 5000 psi, a positive, high pressure seal is required to insure that the process fluid does not leak.

Figure 4:
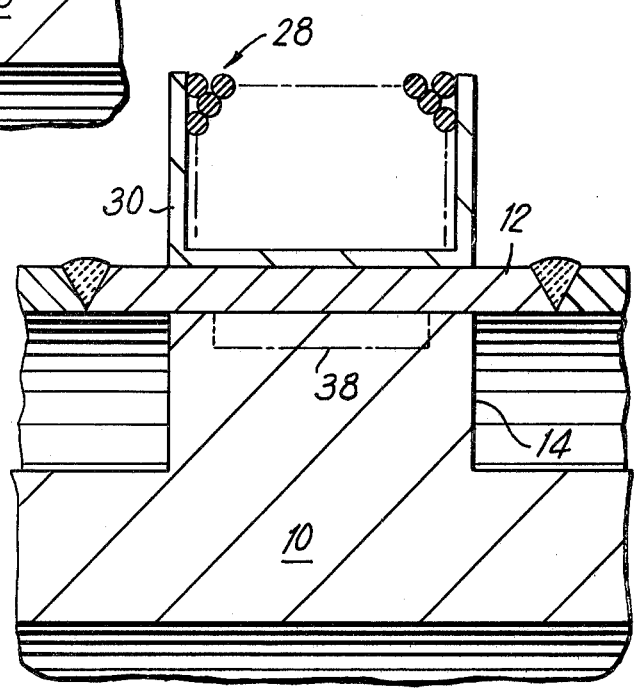
Figure 5:
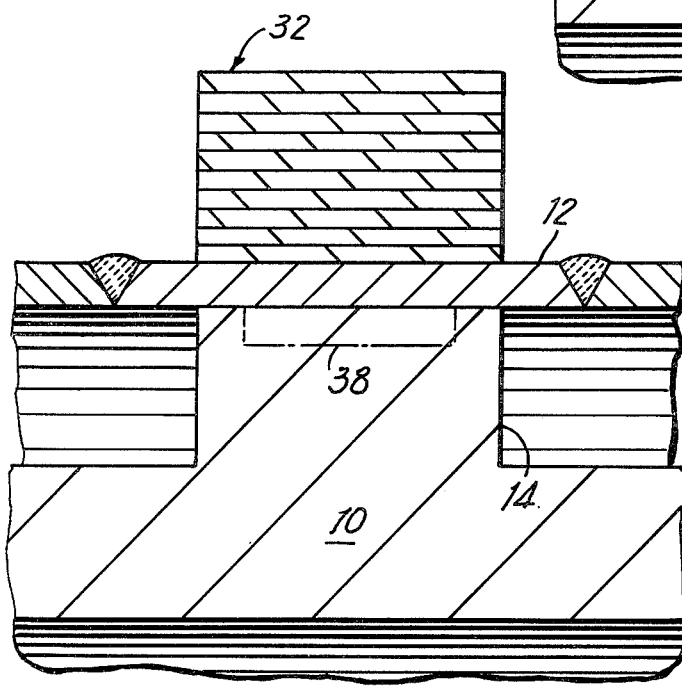

As previously indicated with respect to FIG. 1, in accordance with the instant invention the ring 12 is, in general, surrounded by means for radially compressing the ring 12. FIG. 4 and 5 show alternate constructions for obtaining the desired radial compression of the ring 12. As shown at 28 in FIG. 4, the ring 12 may be wrapped with high strength, tensioned steel wire. In the event that this approach is utilized, a retaining wall 30 for the wire may be provided.

Alternatively, as shown at 32 in FIG. 5, the ring 12 may be wrapped with high strength, tensioned steel bands which thereby provide the desired stress to radially compress the ring 12.

As suggested by the phantom representation at 38 in FIGS. 4 and 5, a portion of the flange 14 may be relieved to increase the bearing stress between the flange 14 and the ring 12.

Although a number of embodiments of this invention have been disclosed, it is expected that those skilled in this art may perceive other embodiments which are nevertheless within the scope of this invention as defined by the claims appended hereto. As an example of another such embodiment, rather than having the first ring initially, slidably mounted on the vessel, a light shrink fit may be used to hold the first ring in place until it is surrounded by radial compression means. The phrase "light shrink fit" is used to mean a shrink fit sufficient to hold the first ring in place but not so great as to induce in the first ring tensile stresses of such magnitude that the yield point of the first ring would be exceeded during testing or use of the vessel.

We claim:
1. An improved vessel which comprises:
 (a) a pressure vessel having a unitary, high strength alloy steel side wall;

(b) at least one flange integral with and extending radially outwardly from said side wall;

(c) at least one ring extending entirely around but not welded to said flange, said ring being comprised of a weldable material having a tensile strength which is less than the tensile strength of the wall of said pressure vessel;

(d) a temperature control jacket surrounding and radially spaced outwardly from the wall of said pressure vessel, at least one end of said temperature control jacket being welded to said at least one weldable ring; and (e) ring compressing means extending entirely around and in contact with said at least one weldable ring, said ring compressing means being tensilely stressed and said at least one weldable ring being compressively stressed against said flange by said ring compressing means.

2. The combination of claim 1 wherein said ring compressing means comprises wire wrapped around said at least one weldable ring.

3. The combination of claim 2 wherein the peripheral center portion of said at least one flange is undercut.

4. The combination of claim 1 wherein said ring compressing means comprises a belt wrapped around said at least one weldable length.

5. The combination of claim 4 wherein the center peripheral portion of said at least one flange is undercut.

6. The combination of claim 1 wherein said ring compressing means comprises a second ring shrink fitted around said at least one weldable ring.

7. The combination of claim 6 wherein the center peripheral portion of said at least one flange is undercut.

* * * * *

UNITED STATES PATENT AND TRADEMARK OFFICE
CERTIFICATE OF CORRECTION

PATENT NO. : 4,093,100
DATED : June 6, 1978
INVENTOR(S) : Ford et al.

It is certified that error appears in the above–identified patent and that said Letters Patent are hereby corrected as shown below:

Cover page [73], line 1 - "Force" should be -- Forge --;

Cover page [73], line 3 - "CDF" should be -- CdF --;

Col. 3, line 63 - "betwen" should be -- between --.

Signed and Sealed this

Twenty-seventh Day of February 1979

[SEAL]

Attest:

RUTH C. MASON
Attesting Officer

DONALD W. BANNER
Commissioner of Patents and Trademarks